(12) United States Patent
Lee

(10) Patent No.: US 8,925,664 B2
(45) Date of Patent: Jan. 6, 2015

(54) FRONT PANEL OPENING/CLOSING SYSTEM INTERLOCKING WITH CAB TILTING

(71) Applicant: Hyundai Motor Company, Seoul (KR)

(72) Inventor: Hyun Woo Lee, Jeollabuk-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/850,615

(22) Filed: Mar. 26, 2013

(65) Prior Publication Data

US 2014/0159424 A1  Jun. 12, 2014

(30) Foreign Application Priority Data

Dec. 11, 2012 (KR) .................. 10-2012-0143649

(51) Int. Cl.
*B62D 33/06* (2006.01)
*B62D 25/10* (2006.01)
*B62D 33/067* (2006.01)
*B62D 33/073* (2006.01)
*E05F 15/04* (2006.01)
*E05F 15/20* (2006.01)

(52) U.S. Cl.
CPC .............. *B62D 25/10* (2013.01); *B62D 33/067* (2013.01); *B62D 33/073* (2013.01); *E05F 15/042* (2013.01); *E05F 15/20* (2013.01); *E05Y 2900/536* (2013.01); *E05Y 2900/516* (2013.01); *E05Y 2900/00* (2013.01)
USPC .................. 180/89.15; 180/89.17; 180/89.18; 180/327; 180/328

(58) Field of Classification Search
USPC .......... 180/89.13, 89.14, 89.15, 89.16, 89.17, 180/89.18, 327, 328
See application file for complete search history.

(56) References Cited

U.S. PATENT DOCUMENTS

| 3,761,123 | A | * | 9/1973 | Neill et al. | ............... | 296/190.05 |
| 3,801,151 | A | * | 4/1974 | Reynolds et al. | ........ | 296/190.05 |
| 3,831,999 | A | * | 8/1974 | Sonneborn | ................ | 180/89.14 |
| 3,853,368 | A | * | 12/1974 | Eichelsheim | .............. | 180/89.14 |

(Continued)

FOREIGN PATENT DOCUMENTS

| KR | 10-1999-0020761 A | 3/1999 |
| KR | 10-2002-0051730 A | 6/2002 |
| KR | 10-2005-0016860 A | 2/2005 |
| KR | 10-0656756 B1 | 12/2006 |
| KR | 10-0764958 B1 | 10/2007 |
| KR | 10-0776657 B1 | 11/2007 |

OTHER PUBLICATIONS

Korean Office Action issued in Korean Application No. 10-2012-0143649 dated Jul. 28, 2014, w/English translation.

*Primary Examiner* — Toan To
(74) *Attorney, Agent, or Firm* — McDermott Will & Emery LLP

(57) ABSTRACT

A front panel opening/closing system includes a hydraulic cylinder, a tilt cylinder, a tilt pump, and a valve. The hydraulic cylinder is connected to a front panel of a cap to perform an operation of opening/closing the front panel. The tilt cylinder is connected to the cap to perform an operation of tilting the cap. The tilt pump is connected to the hydraulic cylinder and the tilt cylinder through a hydraulic line to provide oil pressure. The valve is disposed at the hydraulic line of the tilt pump and the tilt cylinder. When the valve is positioned at a first position, the oil pressure is supplied from a hydraulic pump to the hydraulic cylinder and the tilt cylinder through the hydraulic line. When the valve is positioned at a second position, the oil pressure is supplied from the hydraulic pump only to the tilt cylinder through the hydraulic line.

5 Claims, 11 Drawing Sheets

(56) References Cited

U.S. PATENT DOCUMENTS

| | | | | |
|---|---|---|---|---|
| 3,948,341 A | * | 4/1976 | Foster | 180/89.15 |
| RE29,938 E | * | 3/1979 | Knutson | 180/89.15 |
| 4,327,810 A | * | 5/1982 | Jorda | 180/89.15 |
| 4,351,554 A | * | 9/1982 | Miller | 296/190.02 |
| 4,452,329 A | * | 6/1984 | Stone et al. | 180/89.15 |
| 5,623,410 A | * | 4/1997 | Furihata et al. | 701/37 |
| 5,839,278 A | * | 11/1998 | Sonneborn | 60/403 |
| 8,096,608 B2 | * | 1/2012 | Andou et al. | 296/190.05 |
| 2005/0115752 A1 | * | 6/2005 | Ronacher et al. | 180/89.14 |

* cited by examiner

FRONT PANEL OPENING/CLOSING SYSTEM INTERLOCKING WITH CAB TILTING

CROSS-REFERENCE TO RELATED APPLICATION

This application is based on and claims benefit of priority to Korean Patent Application No. 10-2012-0143649, filed on Dec. 11, 2012 in the Korean Intellectual Property Office, the entire contents of which are hereby incorporated by reference.

TECHNICAL FIELD

The present inventive concept relates to a front panel opening/closing system of a middle or large sized truck, and more particularly, to a front panel opening/closing system interlocking with cap tilting, capable of preventing damage of a front panel due to interference between the front panel and a bumper by allowing the front panel to be opened/closed while interlocking with the cap tilting when a cap-over type middle or large sized truck is tilted.

DESCRIPTION OF THE PRIOR ART

Cap-over type middle or large sized trucks have both of a structure, in which a cap is tilted in order to repair an engine and a chassis component, and a structure, in which a front panel of a cap front part is opened/closed in order to repair a cap part mounting component. Due to characteristics of a commercial truck having a long driving distance, the opening and closing of the front panel and the cap tilting are frequently conducted, more specifically, are conducted two or three times or more daily on average.

FIG. 1 is a perspective view showing a front panel opening/closing structure according to the related art; and FIG. 2 is a perspective view showing a cap tilting structure according to the related art.

Referring to FIGS. 1 and 2, the front panel 10 according to the related art has a structure, in which the front panel 10 is lifted up at a front part of a cap in a state of pulling a lever connected to a mechanical latch 85 by a wire to unlatch the mechanical latch 85 and is supported by a gas lifter 80. In addition, the cap tilting system according to the related art has a structure, in which a tilt switch is operated at the rear of the cap to generate oil pressure in a tilt pump 20 (see FIG. 2), thereby tilting the cap through a tilt cylinder 25 connected to the tilt pump 20 through a hydraulic line while unlatching a tilt oil latch 27 connected to the tile pump 20 through the hydraulic line.

The cap tilting system and the front panel opening/closing system according to the related art are configured as the respective independent systems as described above and are driven according to the respective purpose of use. Meanwhile, is a global trend that only a minimum flow gap is considered as a correlation gap between the front panel 10 and a bumper in order to improve an appearance.

Therefore, when the cap is tilted in a state in which the front panel 10 is closed, since interference may be generated between the bumper and the front panel 10, the front panel 10 should be in a state in which the front panel 10 is first opened in order to avoid the interference between the bumper and the front panel 10 at the time of tilting the cap.

However, since the respective systems are configured independently from each other as described above, in order to tilt the cap, a user should operate each of the front panel 10 and the cap tilting system while moving along a side of the cap, a front part of the cap, and a rear moving line of the cap. When the user performs the cap tilting operation in a state in which the user does not open the front panel 10 due to carelessness, a problem that the front panel 10 is damaged due to interference with the bumper, occurs.

RELATED ART DOCUMENT

Patent Document

Korean Patent Laid-Open Publication No. 1996-14682
Korean Patent Laid-Open Publication No. 1997-35797
Korean Patent Laid-Open Publication No. 2003-82078
Korean Patent Laid-Open Publication No. 2007-23018

SUMMARY

Accordingly, the present inventive concept has been made to solve the above-mentioned problems occurring in the prior art while advantages achieved by the prior art are maintained intact.

An aspect of the present inventive concept relates to a front panel opening/closing system interlocking with cap tilting, capable of maximizing convenience of a user and preventing a quality problem in advance by configuring the cap tilting operation according to the related art performed through several steps as described above as one motion to allow a front panel opening/closing operation and a cap tilting operation to be simultaneously performed.

One aspect of the present inventive concept encompasses a front panel opening/closing system interlocking with cap tilting, including: a hydraulic cylinder connected to a front panel of a cap to perform an operation of opening/closing the front panel; a tilt cylinder connected to the cap to perform an operation of tilting the cap; a tilt pump connected to the hydraulic cylinder and the tilt cylinder through a hydraulic line to provide oil pressure; and a solenoid valve installed at the hydraulic line of the tilt pump and the tilt cylinder, wherein when the solenoid valve is positioned at a first position, the oil pressure is supplied from a hydraulic pump to the hydraulic cylinder and the tilt cylinder through the hydraulic line, and when the solenoid valve is positioned at a second position, the oil pressure is supplied from the hydraulic pump only to the tilt cylinder through the hydraulic line.

The front panel opening/closing system interlocking with cap tilting may further include an oil latch connected to the hydraulic line between the front panel and the tilt pump and performing an operation of latching and unlatching the front panel.

The front panel opening/closing system interlocking with cap tilting may further include a tilt oil latch connected to the hydraulic line between the tilt cylinder and the tilt pump and performing an operation of latching and unlatching the cap, wherein the tilt oil latch is connected to the hydraulic line between the tilt cylinder and the tilt pump at a position closer to the tilt cylinder than the solenoid value.

At the time of interlocking between the operation of opening/closing the front panel and the operation of tilting the cap, a speed at which the front panel is opened/closed may be more rapid than a speed at which the cap is tilted at the time of an initial operation of tilting the cap to avoid interference between the front panel and a bumper.

The front panel opening/closing system interlocking with cap tilting may further include a front panel speed increasing mechanism installed between the hydraulic cylinder and the front panel and increasing a speed at which the front panel is opened/closed, wherein the front panel speed increasing mechanism includes: a crack lever having one end hinge-coupled to an upper end of the hydraulic cylinder and a central portion hinge-coupled to a first bracket fixed to the front panel; and a bracket guide having one end hinge-coupled to the other end of the crack lever and the other end hinge-coupled to a guide groove of a second bracket fixed to the front panel.

The guide groove may have an arc shape.

BRIEF DESCRIPTION OF THE DRAWINGS

The foregoing and other features of the inventive concept will be apparent from more particular description of embodiments of the inventive concept, as illustrated in the accompanying drawings in which like reference characters may refer to the same or similar parts throughout the different views. The drawings are not necessarily to scale, emphasis instead being placed upon illustrating the principles of the embodiments of the inventive concept.

DETAILED DESCRIPTION OF THE PREFERRED EMBODIMENTS

Figure 1:
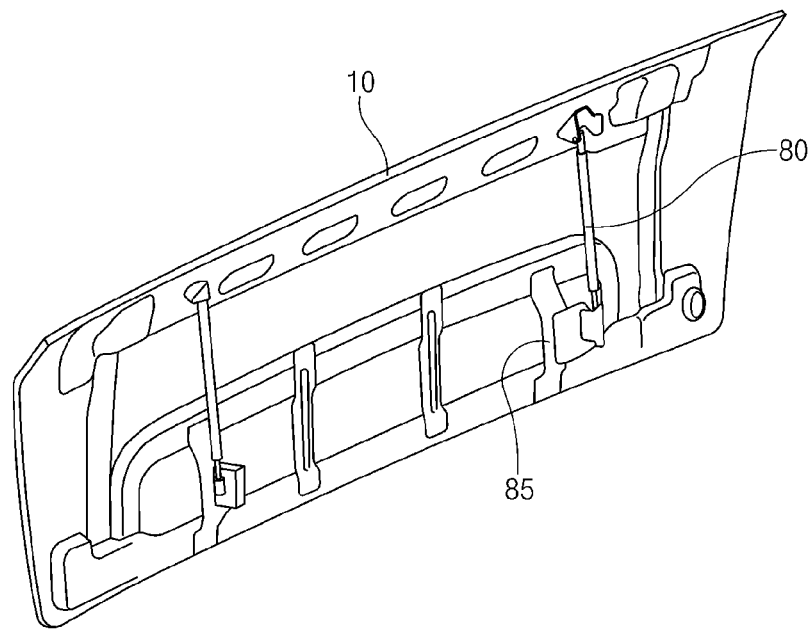
FIG. 1 is a perspective view showing a front panel opening/closing structure according to the related art.
Figure 2:
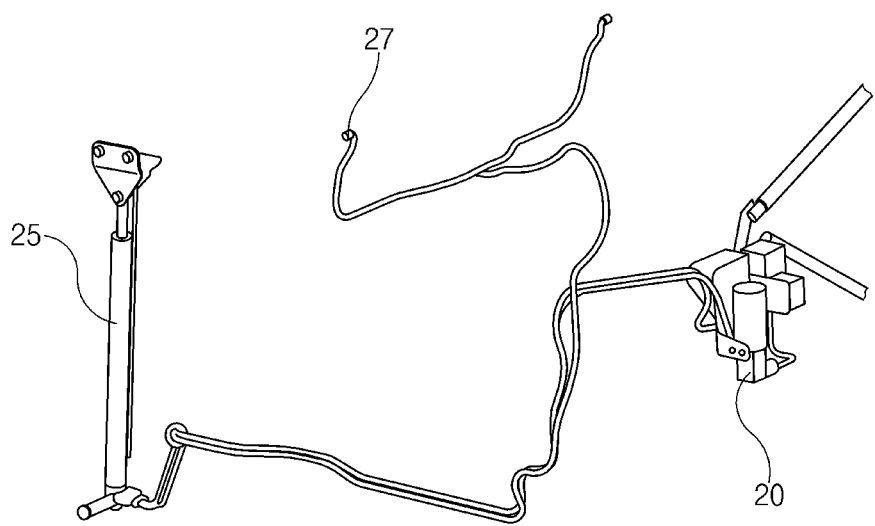
FIG. 2 is a perspective view showing a cap tilting structure according to the related art.

Examples of the present inventive concept will be described below in more detail with reference to the accompanying drawings. The examples of the present inventive concept may, however, be embodied in different forms and should not be construed as limited to the examples set forth herein. Like reference numerals may refer to like elements throughout the specification.

Hereinafter, exemplary embodiments of the present inventive concept will be described in detail with reference to the accompanying drawings.

Figure 3:
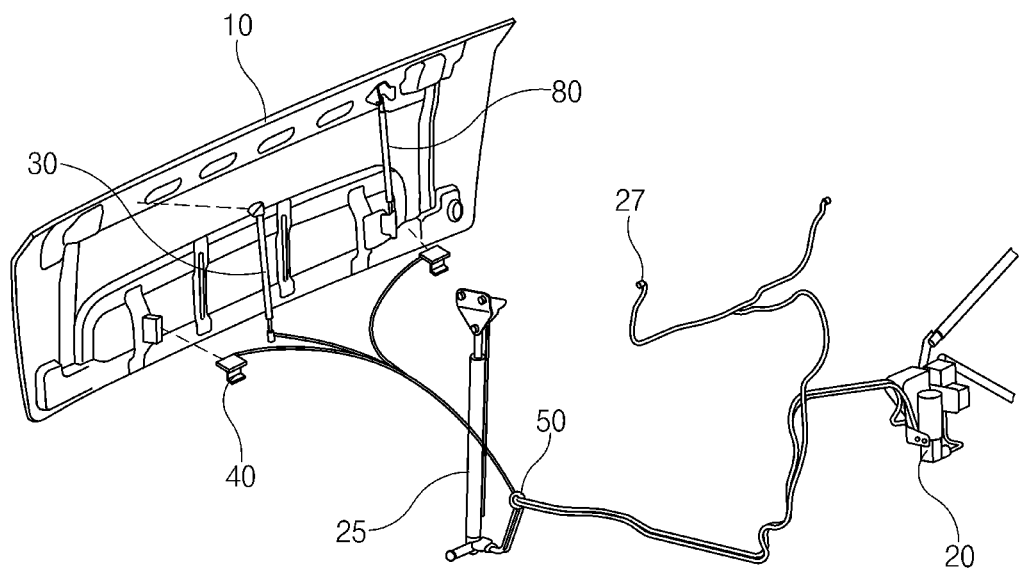
FIG. 3 is a perspective view showing an interlocking structure between cap tilting and a front panel opening/closing structure according to an exemplary embodiment of the present inventive concept.
Figure 4:
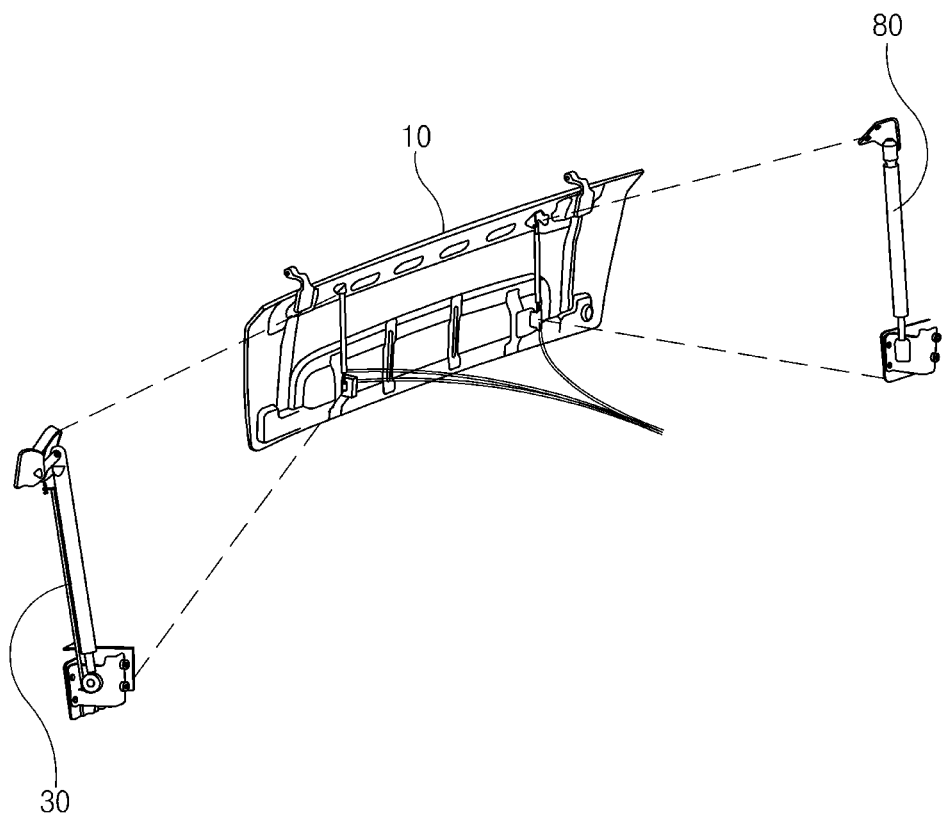
FIG. 4 is a perspective view showing a front panel opening/closing structure according to an exemplary embodiment of the present inventive concept.
Figure 5:
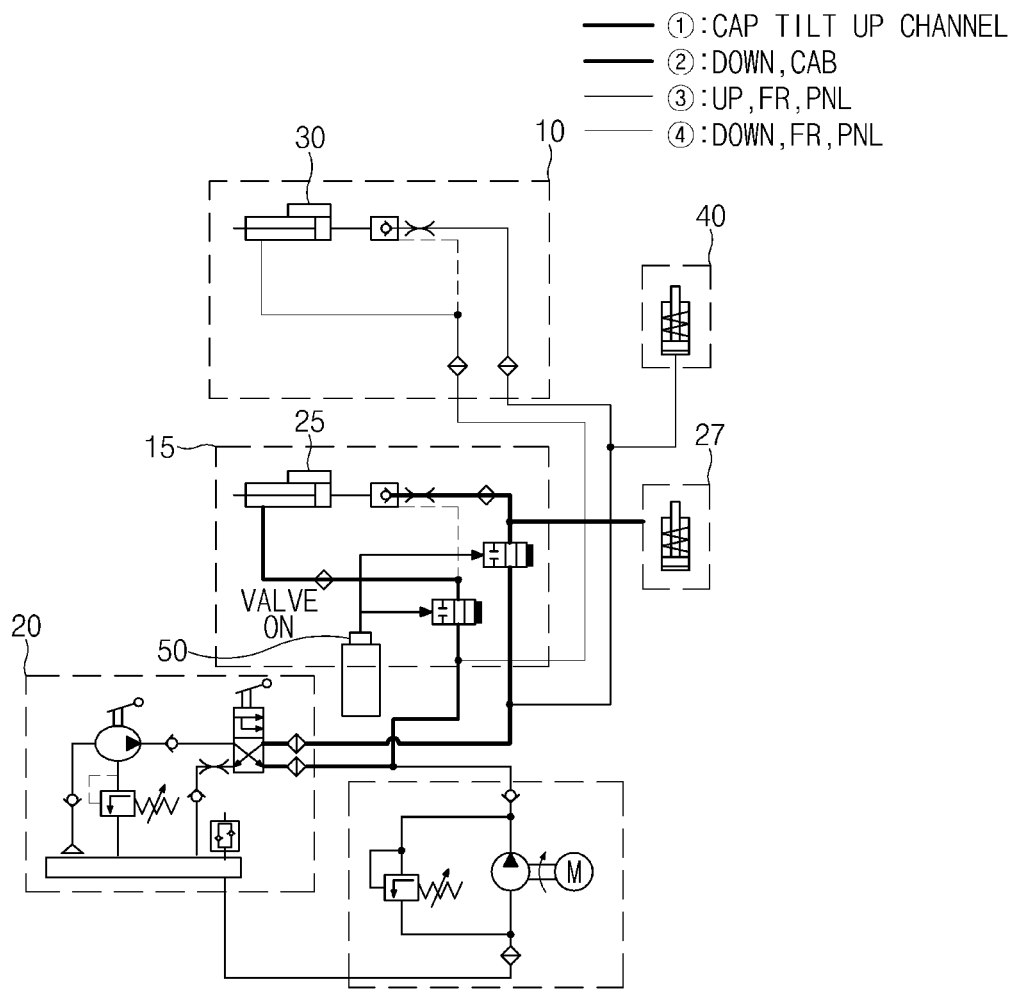
FIG. 5 is a view showing a state in which a front panel and a cap are configured to interlock with each other in a hydraulic system of an interlocking structure of an opening/closing system according to an exemplary embodiment of the present inventive concept.
Figure 6:
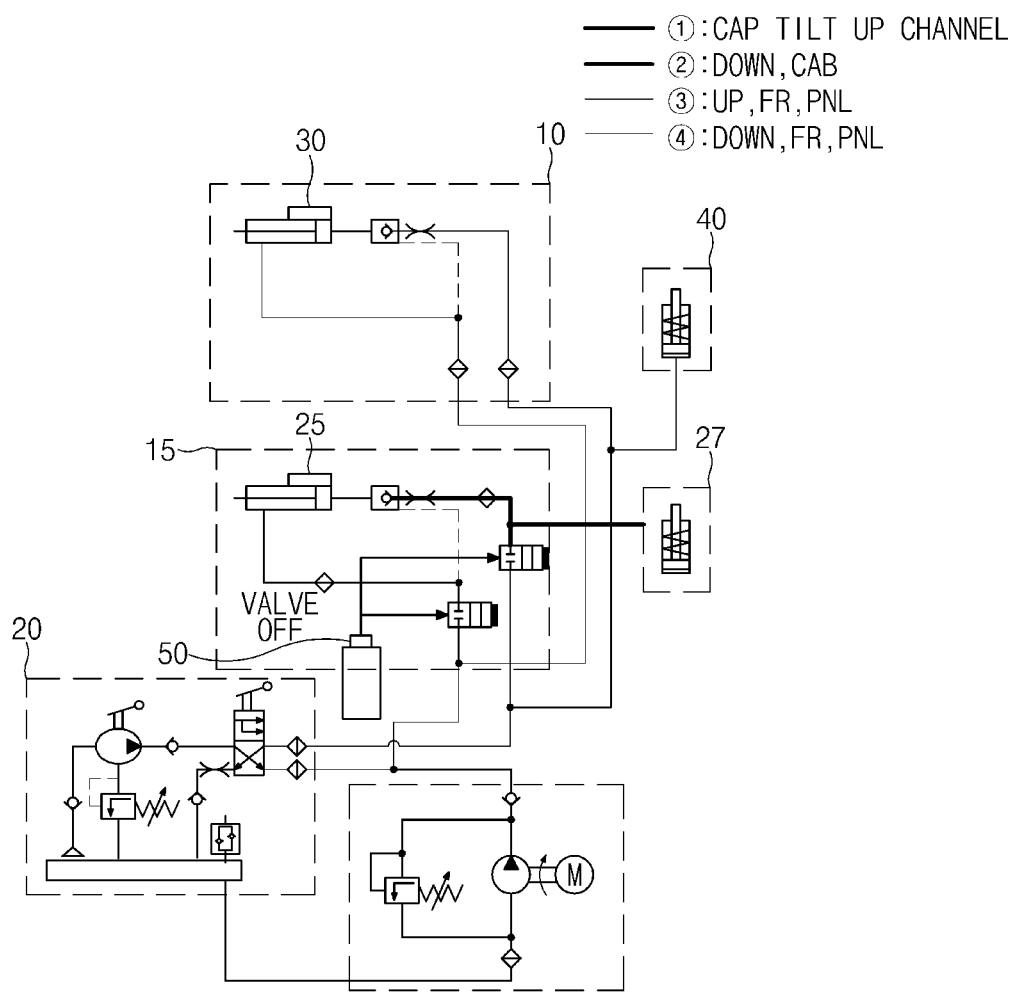
FIG. 6 is a view showing a state in which only a front panel is opened/closed without tilting a cap in a hydraulic system of an interlocking structure of a opening/closing system according to an exemplary embodiment of the present inventive concept.

FIG. 3 is a perspective view showing an interlocking structure between cap tilting and a front panel opening/closing structure according to an exemplary embodiment of the present inventive concept. FIG. 4 is a perspective view showing a front panel opening/closing structure according to an exemplary embodiment of the present inventive concept. FIG. 5 is a view showing a state in which a front panel and a cap are configured to interlock with each other in a hydraulic system of an interlocking structure of an opening/closing system according to an exemplary embodiment of the present inventive concept. FIG. 6 is a view showing a state in which only a front panel is opened/closed without tilting a cap in a hydraulic system of an interlocking structure of an opening/closing system according to an exemplary embodiment of the present inventive concept.

A configuration related to a tilting operation in a front panel opening/closing system interlocking with cap tilting according to an exemplary embodiment of the present inventive concept will be first described with reference to FIGS. 3 and 5. The configuration related to the tilting operation may include a tilt pump 20 generating oil pressure for the cap tilting, a tilt cylinder 25 connected to the tilt pump 20 through a hydraulic line and connected to a cap 15 to perform an operation of tilting the cap 15 (see FIG. 5), and a tilt oil latch 27 connected through a hydraulic line branched from a hydraulic line connecting the tilt pump 20 and the tilt cylinder 25 to each other.

Therefore, when a cap tilt switch is turned on, oil pressure is generated in the tilt pump 20 and then transferred to the tilt cylinder 25 and the tilt oil latch 27 through the hydraulic line, such that latching by the tilt oil latch 27 is released and a rod of the tilt cylinder 25 rises to tilt the cap 15.

Next, a configuration related to opening/closing of the front panel 10 according to an exemplary embodiment of the present inventive concept will be described with reference to FIGS. 3 to 5. The configuration related to the opening/closing of the front panel 10 may include a hydraulic cylinder 30 connected to the front panel 10 of the cap 15 to perform an operation of opening/closing the front panel 10 and connected to the tilt pump 20 through the hydraulic line. In addition, an oil latch 40 may be connected through a hydraulic line branched from a hydraulic line connecting the tilt pump 20 and the hydraulic cylinder 30 to each other As shown in FIG. 4, although the hydraulic cylinder 30 is connected to one side of the front panel 10, a gas lifter 80 may be further installed at the other side of the front panel 10 in order to ensure stability in opening/closing the front panel 10.

Therefore, when the cap tilt switch is turned on, the oil pressure is generated in the tilt pump 20 and then transferred to the hydraulic cylinder 30 and the oil latch 40, such that latching of the front panel 10 by the oil latch 40 is released and a rod of the hydraulic cylinder 30 rises to open the front panel 10.

Since the hydraulic cylinder 30 and the tilt cylinder 25 share the tilt pump 20 providing the oil pressure with each other, when the cap tilt switch is turned on, the hydraulic cylinder 30 and the tilt cylinder 25 are extended together, such that the opening of the front panel 10 and the tilting of the cap 15 are simultaneously performed.

However, since the front panel 10 and the cap 15 completely interlock with each other only with the above-mentioned components, an additional component may be further required in addition to the above-mentioned components in a situation in which only the front panel 10 should be opened.

Therefore, in an exemplary embodiment of the present inventive concept, as shown in FIGS. 5 and 6, in a state in which the hydraulic line is connected between the hydraulic cylinder 30 and the tilt pump 20, a solenoid valve 50 may be installed at hydraulic lines between the tilt cylinder 25, the tilt oil latch 27, and the tilt pump 20.

Therefore, as shown in FIG. 5, in a state in which the solenoid valve 50 is turned on, since the tilt cylinder 25, the tilt oil latch 27, and the tilt pump 20 are connected to each other by the hydraulic line, the front panel 10 and the cap 15 interlock with each other. As shown in FIG. 6, in a state in which the solenoid valve 50 is turned off, since the hydraulic connection between the tilt cylinder 25, the tilt oil latch 27, and the tilt pump 20 is blocked, even though the tilt pump 20 is operated, the oil pressure is supplied only to the hydraulic cylinder 30 and the oil latch 40, such that only the front panel 10 is opened/closed.

Referring to FIG. 5, when a user is to tilt and lift up the cap 15, when the user turns on the cap tilt switch, the solenoid valve 50 is turned on, such that channels of the tilt cylinder 25 and the tilt oil latch 27 are opened. Then, the oil pressure is supplied from the tilt pump 20, such that the tilt oil latch 27 of the cap 15 and the oil latch 40 of the front panel 10 are unlatched, and the oil pressure is applied to a cap tilt up port, such that a cylinder rod of the tilt cylinder 25 ascends to tilt the cap 15. At the same time, the oil pressure is applied to a front panel up port, such that a cylinder rod of the hydraulic cylinder 30 ascends to open the front panel 10.

Thereafter, when the user is to release the tilting of the cap 15, when the user turns off the cap tilt switch, the oil pressure is applied to a cap tilt down port, such that the cylinder rod of the tilt cylinder 25 descends to retrieve the oil pressure while releasing the tilting. At the same time, the oil pressure is applied to a front panel down port, such that the cylinder rod of the hydraulic cylinder 30 descends to retrieve the oil pressure while closing the front panel 10. When operation oil is retrieved, the tilt oil latch 27 and the oil latch 40 are changed into a latched state.

Next, referring to FIG. 6, when the user turns on a front panel open switch in order to open only the front panel 10, the solenoid valve 50 is turned off, such that the channels of the tilt cylinder 25 and the tilt oil latch 27 are closed. Then, the oil pressure is supplied from the tilt pump 20, such that the oil latch 40 of the front panel 10 is unlatched, and the oil pressure is applied to the front panel up port, such that the cylinder rod of the hydraulic cylinder 30 ascends to open the front panel 10.

Then, when the user presses a panel closing switch in order to close the front panel 10, the oil pressure is applied to the front panel down port, such that the cylinder rod of the hydraulic cylinder 30 descends to retrieve the oil pressure while closing the front panel 10. When the operation oil is retrieved, the oil latch 40 is changed into a latched state.

Therefore, through the above-mentioned structure, the front panel 10 may be opened/closed while interlocking with the cap tilting at the time of the cap tilting, and only the front panel 10 may be opened/closed if needed.

The interlocking structure between the cap tilting and the front panel opening/closing as described above may prevent interference between a bumper and the front panel 10. However, when the front panel 10 linearly interlocks with the cap tilting from the initial stage of being opened, an opened amount of front panel 10 is less than an amount of cap tilting, such that the interference between the front panel 10 and the bumper may be still problematic.

Therefore, at the time of interlocking between an operation of opening/closing the front panel 10 and an operation of tilting the cap 15, a speed at which the front panel 10 is opened/closed may be more rapid than a speed at which the cap 15 is tilted at the time of an initial operation of tilting the cap 15 to avoid the interference between the front panel 10 and the bumper.

Hereinafter, an initial opening/closing speed increasing mechanism of the front panel 10 will be described.

Figure 7:
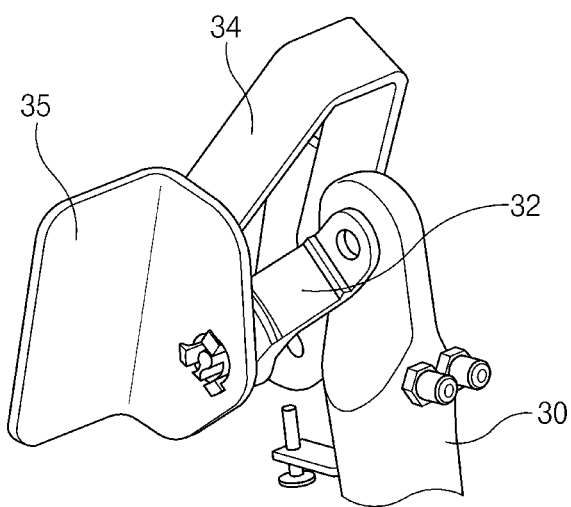
FIG. 7 is a perspective view an opening/closing speed increasing mechanism installed at an upper end of a hydraulic cylinder of the front panel in a front panel opening/closing structure according to an exemplary embodiment of the present inventive concept.
Figure 8:
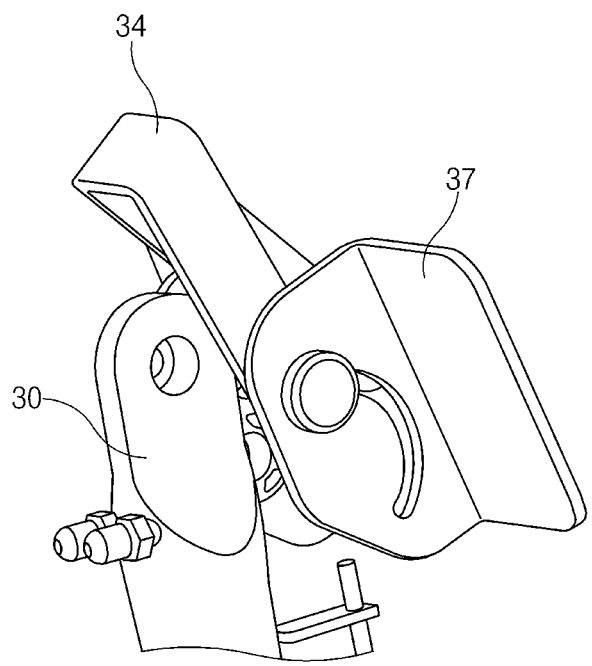
FIG. 8 is a perspective view of the opening/closing speed increasing mechanism of FIG. 7 when viewed at another angle.
Figure 9:
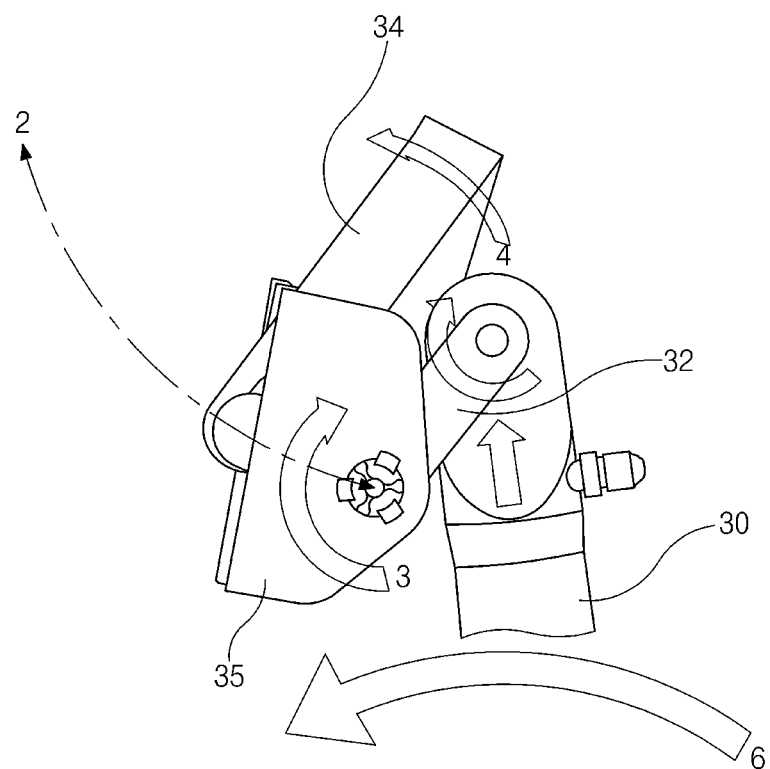
FIG. 9 is a side view showing an initial opening operation of the opening/closing speed increasing mechanism of FIG. 7.
Figure 10:
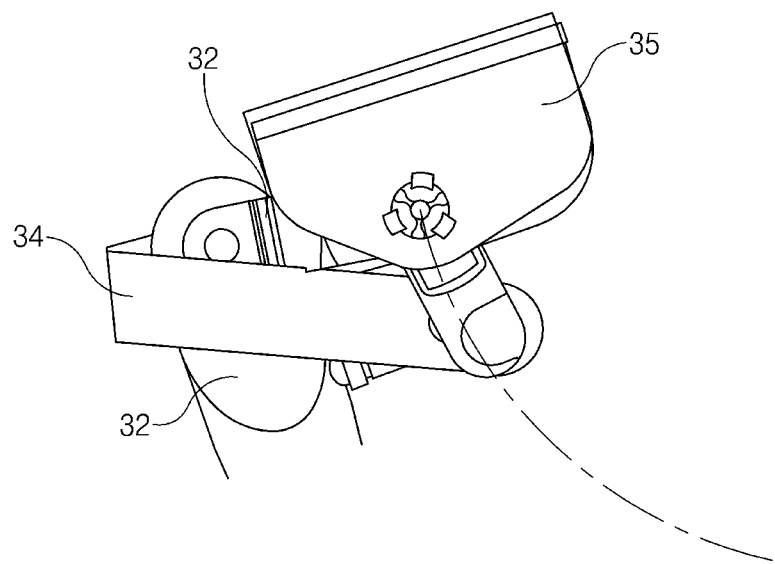
FIG. 10 is a side view showing an initial closing operation of the opening/closing speed increasing mechanism of FIG. 9.
Figure 11:
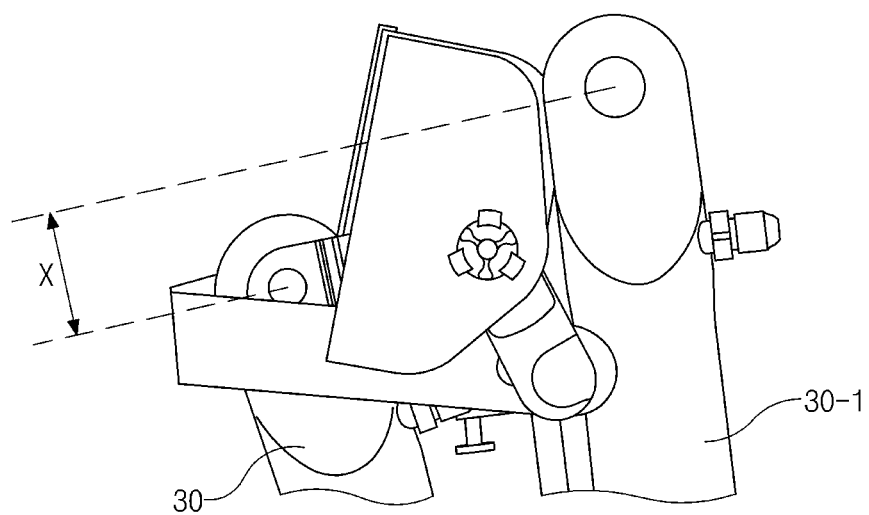
FIG. 11 is a side view showing a difference of a stroke of a hydraulic cylinder between the case in which the opening/closing speed increasing mechanism is used and the case in which the opening/closing speed increasing mechanism is not used.

FIG. 7 is a perspective view an opening/closing speed increasing mechanism installed at an upper end of a hydraulic cylinder of a front panel in a front panel opening/closing structure according to an exemplary embodiment of the present inventive concept. FIG. 8 is a perspective view of the opening/closing speed increasing mechanism of FIG. 7 when viewed at another angle. FIG. 9 is a side view showing an initial opening operation of the opening/closing speed increasing mechanism of FIG. 7. FIG. 10 is a side view showing an initial closing operation of the opening/closing speed increasing mechanism of FIG. 9. FIG. 11 is a side view showing a difference of a stroke of a hydraulic cylinder between the case in which the opening/closing speed increasing mechanism is used and the case in which the opening/closing speed increasing mechanism is not used.

Referring to FIGS. 7 and 8, in an exemplary embodiment of the present inventive concept, a speed at which the front panel 10 is opened/closed may be increased by a front panel speed increasing mechanism installed between the hydraulic cylinder 30 and the front panel 10. The front panel speed increasing mechanism may include a crack lever 32 having one end hinge-coupled to an upper end of the hydraulic cylinder 30 and a central portion hinge-coupled to a first bracket 35 fixed to the front panel 10 and include a bracket guide 34 having one end hinge-coupled to the other end of the crack lever 32 and the other end hinge-coupled to a guide groove of a second bracket 37 (see FIG. 8) fixed to the front panel 10, the guide groove having an arc shape.

An operation of the front panel speed increasing mechanism will be described. At the initial stage at which the front panel 10 is opened, as shown in FIG. 9, when the cylinder rod ascends, the first bracket 35 connected to the crack lever 32 rotates (an arrow 3) while ascending along an opening trajectory (an arrow 2) of the front panel 10 and is hinge-coupled to the other end of the crack lever 32, and the guide bracket 34 hinge- and sliding-coupled to the guide groove of the second bracket 37 (see FIG. 8) receives force applied according to a shape of the guide groove, such that the guide bracket 34 rotates in a direction of an arrow 4 to rotate the crack lever 32 in a direction of the arrow 2. The crack lever 32 is rotated as described above, such that the first bracket 35 ascends over the hydraulic cylinder. Therefore, the hydraulic cylinder 30 rotates in a direction of an arrow 6 to lift the first bracket 35.

Therefore, the hydraulic cylinder 30 ascends at the initial stage, such that the front panel 10 may further ascend by the length of a connection point between the hydraulic cylinder 30 and the crack lever and the length of a connection point between the crack lever 32 and the first bracket.

Then, when the hydraulic cylinder 30 is continuously extended, the first bracket 35 is positioned at a position at which the first bracket 35 is completely opened as shown in FIG. 10, and the hydraulic cylinder 30 continuously moves as shown by an arrow 6 of FIG. 9 to pass through the first bracket 35 and then arrive at a position shown in FIG. 10.

Therefore, as the hydraulic cylinder 30 ascends, the front panel 10 rapidly ascends at the initial stage and then slowly ascends.

In addition, as shown in FIG. 11, according to this structure, the front panel 10 may be completely opened even through the hydraulic cylinder 30 is less extended by x as compared with a structure in which a hydraulic cylinder 30-1 and the front panel 10 are hinge-coupled directly to each other.

As a result, when the initial opening/closing speed increasing mechanism of the front panel 10 is used, it is possible to increase the speed at which the front panel 10 is opened/closed at the initial stage while decreasing an amount of extended hydraulic cylinder.

According to an exemplary embodiment of the present inventive concept, a cap tilting operation method is simplified, thereby making it possible to improve user convenience. The cap 15 is tilted in a state in which the front panel 10 is closed, thereby making it possible to prevent damage of the front panel 10 due to interference between the front panel 10 and the bumper. The front panel 10 is opened/closed in an automatic scheme rather than an existing manual scheme, thereby making it possible to improve convenience and salability.

The respective components of the present inventive concept may be appropriately changed in a range in which their functions are not changed, and are not limited to the above-mentioned embodiment, but may be freely changed without departing from the scope and spirit of the present inventive concept defined by the following claims.

What is claimed is:

1. A front panel opening/closing system interlocking with cap tilting, comprising:
    a hydraulic cylinder connected to a front panel of a cap to perform an operation of opening/closing the front panel;
    a tilt cylinder connected to the cap to perform an operation of tilting the cap;
    a tilt pump connected to the hydraulic cylinder and the tilt cylinder through a hydraulic line to provide oil pressure;
    a solenoid valve disposed at the hydraulic line of the tilt pump and the tilt cylinder; and
    an oil latch connected to the hydraulic line between the front panel and the tilt pump and configured to perform an operation of latching and unlatching the front panel,
    wherein:
        when the solenoid valve is positioned at a first position, the oil pressure is supplied from a hydraulic pump to the hydraulic cylinder and the tilt cylinder through the hydraulic line, and
        when the solenoid valve is positioned at a second position, the oil pressure is supplied from the hydraulic pump only to the tilt cylinder through the hydraulic line.

2. The front panel opening/closing system interlocking with cap tilting according to claim 1, further comprising a tilt oil latch connected to the hydraulic line between the tilt cylinder and the tilt pump and configured to perform an operation of latching and unlatching the cap,
    wherein the tilt oil latch is connected to the hydraulic line between the tilt cylinder and the tilt pump at a position closer to the tilt cylinder than the solenoid value.

3. The front panel opening/closing system interlocking with cap tilting according to claim 1, wherein at the time of interlocking between the operation of opening/closing the front panel and the operation of tilting the cap, a speed at which the front panel is opened/closed is more rapid than a speed at which the cap is tilted at the time of an initial operation of tilting the cap to avoid interference between the front panel and a bumper.

4. The front panel opening/closing system interlocking with cap tilting according to claim 3, further comprising a front panel speed increasing mechanism disposed between the hydraulic cylinder and the front panel and configured to increase a speed at which the front panel is opened/closed,
    wherein the front panel speed increasing mechanism includes:
    a crack lever having one end hinge-coupled to an upper end of the hydraulic cylinder and a central portion hinge-coupled to a first bracket fixed to the front panel; and
    a bracket guide having one end hinge-coupled to the other end of the crack lever and the other end hinge-coupled to a guide groove of a second bracket fixed to the front panel.

5. The front panel opening/closing system interlocking with cap tilting according to claim 4, wherein the guide groove has an arc shape.

* * * * *